(12) United States Patent
Sauer et al.

(10) Patent No.: US 7,556,857 B2
(45) Date of Patent: Jul. 7, 2009

(54) POLYMERIC ADDITIVES FOR ENHANCEMENT OF BALLISTIC PERFORMANCE IN FIBROUS STRUCTURES

(75) Inventors: Bryan Benedict Sauer, Boothwyn, PA (US); Kalika Ranjan Samant, Hockessin, DE (US); Joseph D. Trentacosta, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 376 days.

(21) Appl. No.: 11/158,762

(22) Filed: Jun. 21, 2005

(65) Prior Publication Data

US 2005/0282450 A1 Dec. 22, 2005

Related U.S. Application Data

(60) Provisional application No. 60/581,473, filed on Jun. 21, 2004.

(51) Int. Cl.
*B32B 27/36* (2006.01)
(52) U.S. Cl. .................. 428/395; 428/357; 442/181
(58) Field of Classification Search .................. 428/911, 428/357, 365, 395, 373; 2/2.5; 442/59, 134, 442/135, 181, 327, 304; 89/36.01, 36.02, 89/36.05
See application file for complete search history.

(56) References Cited

U.S. PATENT DOCUMENTS

| | | |
|---|---|---|
| 3,649,426 A | 3/1972 | Gates |
| 4,737,401 A | 4/1988 | Harpell et al. |
| 5,229,199 A | 7/1993 | Miner et al. |
| 5,349,893 A * | 9/1994 | Dunn ................ 89/36.05 |
| 5,354,605 A | 10/1994 | Lin et al. |
| 5,776,839 A | 7/1998 | Dischler et al. |
| 5,854,143 A | 12/1998 | Schuster et al. |
| 6,701,529 B1 | 3/2004 | Rhoades et al. |
| 2006/0252325 A1 * | 11/2006 | Matsumura et al. ......... 442/123 |

FOREIGN PATENT DOCUMENTS

| | | |
|---|---|---|
| EP | 0 678 724 A1 | 10/1995 |
| WO | WO 89/06190 | 7/1989 |
| WO | WO 00/46303 | 8/2000 |
| WO | WO 2004/074761 A1 | 9/2004 |
| WO | WO 2004/074761 A1 | 9/2004 |

OTHER PUBLICATIONS

Briscoe, B. J., Motamedi, F., "Role of interfacial friction and lubrication in yarn and fabric mechanics", Textile Research Journal 1990 6(12), 697.
Briscoe, B. J., Motamedi, F., "The ballistic impact characteristics of aramid fabrics: the influence of interface friction", Wear 1992 158(1-2), 229.
Lee, Y.S. et al., N.J. Advanced Body Armor Utilizing Shear Thickening Fluids, 23rd Army Science Conference, 20002.
Starkweather, H. W., Giri, M. R., "Use of a Dynamical Mechanical Analyzer to Study Supported Polymers", J. Appl. Polym. Sci. 1982, 27, 1243.
Bazhenov, S., "Dissipation of Energy by Bulletproof Aramid Fabric", J. Mat. Sci., 32, 1997, 4167.

* cited by examiner

*Primary Examiner*—Arti Singh-Pandey

(57) ABSTRACT

A fibrous structure made from a fiber and about 1 to about 15 wt % of a high viscosity polymer that has a glass transition temperature of about minus 40 to about 0° C. and useful for making bullet resistant articles.

6 Claims, No Drawings

POLYMERIC ADDITIVES FOR ENHANCEMENT OF BALLISTIC PERFORMANCE IN FIBROUS STRUCTURES

CROSS REFERENCE(S) TO RELATED APPLICATION(S)

This application claims benefit of priority from Provisional Application No. 60/581,473 filed on Jun. 21, 2004.

BACKGROUND OF THE INVENTION

1. Field of the Invention

The present invention is related to a fiber structure impregnated with low glass transition temperature viscous polymer adhesives and to articles made therefrom.

2. Description of the Related Art

Although many flexible body armor constructions adequately stop ballistic projectiles, the shock associated with blunt trauma can still cause substantial injury or death in an article such as a protective vest. Reducing the high level of blunt trauma can be accomplished by dissipating and spreading out the energy of impact.

Previously, stiffer layers have been provided near the body to reduce blunt trauma, but this is known to significantly compromise ballistic resistance to penetration and to add to the weight of the body armor, while reducing comfort.

International application (WO 2004/074761 A1) discloses visco-elastic polymer fluids that were solvent impregnated into ballistic fabrics and other related fiber containing ballistic sheets. Preferred range of glass transition temperature ($T_g$) is $-128°$ C. to $-40°$ C. Low viscosities of 0.25 Pa s to $2.5 \times 10^4$ Pa s were considered.

Briscoe, B. J., Motamedi, F., "Role of interfacial friction and lubrication in yarn and fabric mechanics", *Textile Research Journal* 1990 6(12), 697 and Briscoe, B. J., Motamedi, F. "The ballistic impact characteristics of aramid fabrics: the influence of interface friction", *Wear* 1992 158(1-2), 229 both describe medium viscosity polymer fluids that were impregnated into fabrics. Additives had a low $T_g$ of $-115°$ C. They found a lubrication effect as expected.

U.S. Pat. No. 6,701,529 to Rhoades et al disclose an energy absorbent medium of polymer, lubricant, and/or filler components that stiffens in proportion to the rate of an applied force. Polyborosiloxane polymer fluids and other hydrogen bonding polymer fluid mixtures exhibit dilatant (shear thickening) characteristics.

U.S. Pat. No. 3,649,426 and Lee, Y. S. et al. (N.J. Advanced Body Armor Utilizing Shear Thickening Fluids, 23$^{rd}$ Army Science Conference, 2002) consider shear-thickening suspensions of particles in conjunction with ballistic fibers.

WO 00/46303 and U.S. Pat. No. 3,649,426 describe polyaramid fabrics with shear-thickening particle suspensions in pouches or in back of polyaramid panels.

U.S. Pat. No. 5,776,839 discloses the application of dilatant dry powders, with a typical composition consisting of carbon black, fumed silica (nano-silica) and a small amount of adhesive "glue" to ballistic fibers and fabrics.

U.S. Pat. No. 5,229,199 considered rigid composites of woven aramid fabrics coated with an adhesion modifier and imbedded in a matrix resin. The reduced friction and weakened interfaces led to improved ballistic performance. If friction is too high in a fabric, or if the matrix is too stiff, ballistic resistance is severely compromised.

U.S. Pat. No. 5,354,605 used low $T_g$, high molecular weight elastomers as adhesive matrix materials for fiber layers. These provided flexibility in unidirectional ballistic layers.

U.S. Pat. No. 5,854,143 describes material for antiballistic protective clothing comprising, in a single-layer or multi-layer package or laminate, at least one layer of a flat structure containing a coated dry powder which is an organic dilatancy agent.

It is a desirable goal to improve resistance to blunt trauma in flexible body armor, while retaining the high ballistic resistance. Moreover, increased comfort and lower weight of ballistic vests are desirable properties to be achieved.

SUMMARY OF THE INVENTION

This invention is directed to a fibrous structure of a fiber and about 1 to about 15 wt % of a high viscosity polymer that has a glass transition temperature of about $-40$ to about $0°$ C. and protective articles made from such fibrous fibers.

DETAILED DESCRIPTION OF THE INVENTION

In this invention, one or more, high viscosity polymer adhesives with low glass transition temperatures are coated onto or impregnated into a fiber structure. The high viscosity polymer adhesive may be variously referred to as polymer or adhesive. Also, when the term impregnated is used, it should be understood that it is also intended to embrace coating. Excellent ballistic resistance is preserved while blunt trauma resistance is improved. Back face deformation is an indicator of blunt trauma, that is, the lower the BFD, the less trauma a person wearing a protective device would sustain. Unlike prior-art systems, this low level of content has been found to be effective in many different types of fiber structures. A liquid adhesive impregnated into a fiber structure at low levels essentially acts as a friction enhancer by modifying the sliding friction of the filaments in the weave under ballistic impact conditions. Moreover, the inventive material provides a reduction in back face deformation (BFD), while retaining or slightly improving ballistic resistance to penetration in an article such as body armor. BFD is expressed in millimeters (mm) throughout the specification.

The present invention is also an article comprising one or more layers of a high performance fiber structure impregnated (or coated) with about 1 to 15 percent by weight of a high viscosity adhesive with a $T_g$ between about $-40°$ C. and $0°$ C. The glass transition temperatures were measured using differential scanning calorimetry (DSC) at $10°$ C./min heating rates. The center point of the transition was chosen as $T_g$. $T_g$ is expressed in $°$ C. throughout the specification.

In contrast to the subject adhesives, solid adhesive matrices result in reduced ballistic penetration resistance, as do other stiffer additives and as well as systems that are too stiff or too high in friction due to the presence of about 15 wt % or more of the adhesive additive. As discussed below, such behavior is expected for very high friction and stiffness in impregnated fabrics as when multiple layers are impacted by high velocity projectiles.

Regarding the response of fabrics with low $T_g$ adhesives during impact, it is important to consider the strain rate dependence of these systems. One way to understand this experimentally is to apply frequency dependent dynamic mechanical methods. For testing, inert glass support fabrics were impregnated with either poly(vinylpropionate) (PVP) or with poly(hexylmethacrylate) (PHM). The PHM was deposited out of solution with toluene and the toluene was removed.

These samples were used in frequency dependent dynamic mechanical analysis (DMA). The experiment and equipment are standard and were described in "Use of a Dynamical Mechanical Analyzer to Study Supported Polymers" Starkweather, H. W., Giri, M. R., J. Appl. Polym. Sci. 1982, 27, 1243. The frequency dependent glass transitions were resolved as maxima in the loss signal. Taking the frequency extremes, at 0.1 Hz and 30 Hz the $T_g$ in PHM ranged from −18.5° C. to −2° C., respectively. Over the same frequency range, the $T_g$ for PVP ranged from 3° C. to 12.5° C. These correspond to activation energies of 40 kcal/mol and 65 kcal/mol for PHM and PVP, respectively. The very high strain rates of the ballistic event contribute to a high equivalent frequency of deformation ($>>10^5$ Hz). This elevated strain rate easily converts PVP and PHM from the liquid to the glassy solid phase. For example, at $10^5$ Hz, the $T_g$ based on this activation energy for PHM would be shifted to 25° C. This value shows that even PHM is well into the glassy phase at room temperature under the high strain rates induced by ballistic impact.

The $T_g$ of the high viscosity adhesive used in this invention falls in the range of about −40 to about 0° C. and preferably in the range of about −35 to about −10° C. For these materials, the high strain rates from the ballistic event are enough to shift this frequency dependent $T_g$ above room temperature, converting the viscous adhesives into stiff glassy solids. Because of the low $T_g$ and "fluid" nature, these adhesives provide flexible fabrics for making protective vests that are comfortable under static conditions. If the glass transition is below about −40° C., the strain rates are not high enough to convert the system into a glassy phase.

As noted above, the adhesives should be high viscosity polymer fluids. They should not be elastic solids, very high molecular weight polymers, semi-crystalline elastic solids, or cross-linked elastic solids. Polymers such as these can reduce penetration resistance and will be stiffer, thereby causing a reduction in comfort. Furthermore, the solid adhesives applied at low levels, especially, will not be self-healing and will lose effectiveness once the fabric is deformed substantially.

These high viscosity adhesives impart moderate to relatively high friction. For high viscosity adhesives having a $T_g$ in the range of about −40° C. to about 0° C., elevated friction over a dry fabric control sample correlates well with BFD and contributes to a performance advantage. Viscosity of the impregnated additive also correlates with fabric stiffness.

In addition to $T_g$, the adhesives used in this invention may also be characterized by their molecular weight (Mw) and viscosity. Molecular weights are weight average and typically determined by gel permeation chromatography. The molecular weight of the viscous fluid polymer may, for example, be in the range of about 20,000 to 400,000 g/mol. The desired viscosity range for the viscous fluid polymers is about $2\times10^6$ to about $10^{13}$ poise. Viscosity is typically measured at room temperature, but generally, the viscosities of the subject adhesives as provided herein are too high at room temperature to be measured by standard techniques. In which case, viscosity is estimated by extrapolating from high temperature melt viscosity, melt flow index characterization or other qualitative rheological characterization. One typical method applied for zero shear viscosity characterization of polymer fluids is cone-and-plate rheometry or capillary viscometry. A low viscosity outside the above range will typically reduce performance, such as in the case of siloxane fluids with low $T_g$, even those with high Mws. These materials reduce friction due to lubrication. This has been correlated with poor ballistic performance as disclosed by Briscoe, B. J., Motamedi, F. "The ballistic impact characteristics of aramid fabrics: the influence of interface friction", Wear 1992 158(1-2), 229).

Liquid adhesives with appropriate properties can be formed in many ways including as a suspension, emulsion or melt polymerization and in the form of blend or a copolymer. Examples of polymers useful as high viscosity adhesives herein include poly (vinyl propionate), poly(hexyl methacrylate), poly(isopropyl acrylate), and ethylene/methyl acrylate copolymer (wherein the ethylene content is 38 weight percent and the methyl acrylate content is 62 weight percent).

A fiber structure may be prepared from a fiber made from a polymer such as a polyolefin (for example, polyethylene or polypropylene), polyimide, polyester, poly(vinyl alcohol), polybenzimidazole (PBI), polyaramid, such as poly(paraphenylene terephthalamide) sold by E. I. du Pont de Nemours and Company (DuPont), Wilmington, Del. under the trade name KEVLAR®, polyareneazoles and polypyridazoles such as polypyridobisimidazole. Polypyridobisimidazole is available from Magellan Systems International, Richmond Va. under the trade name M5®. The tenacity of a fiber should be at least about 900 MPa according to ASTM D-885 in order to provide superior ballistic penetration resistance. Preferably, a fiber also has a modulus of at least about 10 GPa.

High performance fiber structures can take many forms such as knitted fabric, woven fabric, uniweave structures, uni-directional sheets, multi-directional sheets (those, for example, having fibers crossing over at an angle between about 20 and 90 degrees), a non-woven layer (for example, felt), or even as single fibers. A fiber structure may take the form of more 10, 20, 40, or 60 layers of individual fiber structures of this invention.

Treated layers may be placed at the back, away from the point of impact, or may be placed in the middle, or in any other fashion in order to optimize performance in the body armor. The polymer concentration may be the same for each of the treated layers, or may vary from layer to layer so as to provide a desired variation of stiffness through the pack. Treated layers can be used in a pack consisting of types of fabric structures that may vary from layer to layer.

High viscosity adhesives with flow and modulus properties distinctly different from solid elastomers were impregnated into ballistic fabrics. A desirably high level of both ballistic penetration resistance and back face deformation (a measure of blunt trauma) was found in the range of about 1 to about 15 wt % additive level in polyaramid fabric depending on how many layers were treated. It is believed that this type of system would provide about a 20-30% weight savings compared to the area density needed to provide satisfactory blunt trauma protection in fabric vests currently in use. High viscosity adhesives as used in this invention have a glass transition temperature $T_g$ that enables them to give desirable liquid adhesive performance in this invention, and control back face deformation through viscosity and friction effects in a fiber structure.

Protective body armor is a major application for this invention. The impregnated high performance fiber structure may be manufactured into body armor by a standard vest-making process such as stitching. Body armor is constructed by manufacturers in order to meet penetration resistance, blunt trauma, and other requirements as established by the National Institute of Justice via NIJ 100-98. According to NIJ 100-98, the manner in which the ballistic panels are assembled into a single unit differs from one manufacturer to another. In some cases, the multiple layers are bias stitched around the entire edge of the panel; in others, the layers are tack stitched together at several locations. Some manufacturers assemble the fabrics with a number of rows of vertical or horizontal stitching; some may even quilt the entire ballistic panel. No evidence exists that stitching impairs the ballistic-resistant properties of a panel. Instead, stitching tends to improve the overall performance, especially in cases of blunt trauma, depending upon the type of fabric used.

EXAMPLES

Examples are provided with viscous liquid polymers to demonstrate the various polymers that impart improved BFD as well as appropriate comparative examples. It is noteworthy that heretofore, much of the literature suggests that adding "adhesive" matrix or elastomer resins to polyaramid fabric reduces ballistic performance, as described in U.S. Pat. No. 5,229,199. For example, if friction is too high in the fabric because the matrix is too stiff, ballistic resistance of vests made of polyaramid fabric is severely compromised.

PVP, poly (hexyl methacrylate), poly (isopropyl acrylate), poly(vinyl ethyl ether), poly(isobutyl acrylate), poly(isobutyl acrylate), and poly (dimethyl siloxane) were obtained from Scientific Polymer Products Inc. of Ontario, N.Y. Poly(phenyl methyl siloxane) and poly(diphenyl siloxane-co-dimethyl siloxane) were obtained from Gelest Inc. of Tullytown, Pa. The ethylene/methyl acrylate (38/62) copolymer and ethylene/methyl acrylate/butyl acrylate terpolymer were obtained from DuPont, however, the ethylene/methyl acrylate copolymer as used herein is an experimental grade.

Fabrics for ballistic, pullout, and other tests are impregnated with polymers either from the melt using a transfer method for example, or by solution coating. For solution coating, the solutions contain about 5-20 wt % of the polymer with the remainder solvent. The polymer solutions are spread on the fabrics, and then the solvent is allowed to evaporate. Impregnation could be accomplished by brushing, spraying, or dipping in order to contact the high viscosity adhesive solution with the high performance fiber structure. The volume of polymer solution added is used to control the final weight percent of additive in a polyaramid fabric such as Kevlar® brand fabric available from DuPont.

Fiber pullout tests are conducted on an Instron to probe yarn friction modification as a result of fabric surface treatments by lubricants and adhesives. This test considers friction as a single 840 denier polyaramid filament is pulled through a 100 mm wide single layer of fabric clamped as described in Bazhenov, S., Dissipation of Energy by Bulletproof Aramid Fabric, J. Mat. Sci., 32, 1997, 4167. Essentially, the maximum force to pull out the single polyaramid strand is recorded on an Instron or other load-sensing device.

Ballistic tests are conducted in order to develop suitable materials for reducing back face deformation for National Institute of Justice level II protection using magnum 0.357 copper-jacketed lead bullets. Back face deformation tests are performed by impacting typically multi-layer polyaramid fabric panels held against a clay bed and measuring the depth of indentation in millimeters (mm) due to the ballistic event with a nominal strike velocity of about 1425 ft/sec.

The sample fabrics had a plain weave construction using 840 denier polyaramid yarn and had a nominal face weight of 5.8 oz/sq. yd. Twenty-one such layers measuring 15 in×15 in were sewn in an "X" pattern using polyaramid sewing thread after having taped the edges of the panel. Unless noted otherwise, ten of the 21 layers were treated with the liquid polymer adhesives and were placed closest to the clay bed.

$V_{50}$ is defined as the critical velocity in feet per second (ft/s) where half of the bullets are completely stopped by the panel and half penetrate through the panel. In the following examples, as applicable, the $V_{50}$ was measured for panels backed by clay.

Example 1-2 and Comparative Examples A-B

The effect of the poly(vinyl propionate) (PVP) concentration on fiber pullout was determined on the polyaramid fabric. The PVP was obtained from Scientific Polymer Products Inc. of Ontario, N.Y. Friction is related to the pullout force and increases substantially with concentration even at the relatively low concentrations as shown in Table 1. The weight percent PVP in this table is based on dry levels of the additive versus weight of polyaramid fabric.

TABLE 1

| Ex | Wt. % | Maximum Force (N) |
|---|---|---|
| Comp A | 0 | 6 |
| Comp B | 1 | 6 |
| 1 | 4 | 30 |
| 2 | 7 | 55 |

Examples 3-5 and Comparative Example C

The moderate increase in friction as noted above contributes to an improvement of back face deformation (BFD) for the case of systems containing polyaramid fabric layers with a basis weight of ~0.84 pound per square foot (psf) impregnated with up to 10 wt % of PVP liquid adhesive. This is accomplished while retaining and even improving ballistic penetration resistance as measured by $V_{50}$ in Table 2.

TABLE 2

| Ex | Wt. % | BFD | $V_{50}$ |
|---|---|---|---|
| Comp C | 0 | 44 | 1430 |
| 3 | 8 | 36 | 1480 |
| 4 | 10 | 34.6 | 1480 |
| 5 | 15 | Fail | 1360 |

Good performance in ballistic penetration resistance and BFD is found at about 8-10 wt % additive (PVP) level in Kevlar® fabric as shown in Table 2. However, concentrations of 15 wt % show reduced ballistic penetration resistance due to high friction.

Comparative Examples D-F

Comparative examples were prepared using fabrics of Kevlar® polyaramid with 1.26 pound per square ft. (psf) basis weight impregnated with solid adhesives having a vinyl ester hard resin matrix.

TABLE 3

| Ex | Wt. % | $V_{50}$ |
|---|---|---|
| Comp D | 0 | 1580 |
| Comp E | 20 | 1200 |
| Comp F | 30 | 1120 |

The almost universal deterioration of $V_{50}$ with addition of increasing concentrations of matrix resin is shown in Table 3.

Examples 6-10 and Comparative Examples G-N

Polyaramid fabrics were impregnated with low weight fractions of low glass transition polymers as follows:

PVP at 9 wt % and 15 wt % (Ex 6, 7 respectively), PHM at 10 wt % (Ex 8), poly (isopropyl acrylate) at 8 wt % (Ex 9); ethylene/methyl acrylate (38/62) copolymer at 8 wt % (Ex 10).

Twenty-one (21) layers of the polyaramid layers without any added polymer was used as Comparative Example G.

Polyaramid fabrics were impregnated with the following polymers for comparative purposes: poly acrylonitrile-butadiene liquid at 8 wt % (Comp Ex H); poly(isobutyl acrylate) at 9 wt % (Comp Ex I); poly(vinyl ethyl ether) at 9 wt % (Comp Ex J) and ethylene/methyl acrylate/butylacrylate (37/50/13) terpolymer at 8.8 wt % (Comp Ex K).

Polyaramid fabrics were also impregnated with siloxanes at about 10 wt % with low to very low glass transition temperatures as follows: poly(phenyl methyl siloxane)(Comp Ex L); poly(diphenyl siloxane-co-dimethyl siloxane) (Comp Ex M), poly(dimethyl siloxane) (Comp Ex N).

Even though one of the siloxanes is fairly viscous because of its high molecular weight (i.e., Comp N, polydimethyl siloxane, i.e., silicone oil, Mw=94 Kg/mol), none show improvement in BFD.

As was discussed above, concentrations of PVP greater than 15 wt % impart high friction leading to reduced ballistic penetration resistance (lower $V_{50}$, Table 2).

TABLE 4

| Ex | $T_g$ | Mw/Viscosity | $V_{50}$ | BFD |
|---|---|---|---|---|
| G | | | 1390 | 42 |
| 6 | −10 | 30k/$10^8$ | 1470 | 35.1 |
| 7 | −10 | 30k/$10^8$ | 1340 | * |
| 8 | −20 | 400k/$10^{10}$ | 1440 | 36.4 |
| 9 | −8 | 120k/$10^8$ | 1425 | 36.5 |
| 10 | −32 | 40k/6 × $10^6$ | 1440 | 36 |
| Comp H | −37 | 8k/5 × $10^3$ | 1370 | * |
| Comp I | −28 | 50k/$10^5$ | 1340 | * |
| Comp J | −35 | 100k/$10^6$ | 1385 | * |
| Comp K | −42 | 40k/$10^6$ | 1375 | * |
| Comp L | −57 | 5k/10 | 1420 | 44 |
| Comp M | −78 | 10k/10 | 1420 | 44 |
| Comp N | −120 | 94k/$10^3$ | 1390 | 45 |

* $V_{50}$ was so low that quantitative BFD could not be obtained because of excessive penetrations at impact velocities of 1430 ft/s where BFD is tested.

Viscosity (expressed in poise) was estimated by extrapolating from high temperature values as explained above and was generally rounded to the next higher order of magnitude. However, the viscosity of Comparative Examples L-N were low enough that they were quantitatively measured at about 20° C. The manufacturer's measured viscosity for Comp H was 5000 Poise at 27° C.

Comparative Examples O-Q

Kevlar fabric at 840 denier was made with no additive (O). Also, fabrics were prepared with the following solid additives: 9 wt % polyurethane (solvent applied) solid, cross-linked (P) and 12 wt % elastic Surlyn® (melt applied) solid, crystalline (Q). Surlyn® is available from DuPont.

TABLE 5

| Ex | $T_g$ | $V_{50}$ | BFD |
|---|---|---|---|
| O | | 1390 | 40.6 |
| P | −70 | 1370 | 31 |
| Q | −50 | 1300 | n.d.* |

*All shots penetrated through the panel so BFD was not determined.

The results with solid adhesives in Table 5 verify that elevated stiffness leads to poorer ballistic penetration resistance (lower $V_{50}$) at relatively low weight fractions. Such systems are also substantially stiffer than those treated with liquid adhesives and this will decrease comfort.

What is claimed is:

1. A fibrous structure, comprising a polyaramid fiber that has a tenacity of about 900 MPa and about 1 to about 15 wt % of polyvinyl propionate polymer.

2. The fibrous structure according to claim 1, in the form selected from the group consisting of knitted fabric, a woven fabric, a uniweave structure, a uni-directional sheet, a multi-directional sheet, a non-woven layer, and a single fiber.

3. An article, comprising one or more layers of the fibrous structure of claim 2.

4. The article of claim 3, wherein the fiber comprises poly (paraphenylene terephthalamide).

5. The article of claim 3, wherein the article is body armor.

6. The article of claim 3, wherein the article is body armor comprising a combination of treated and untreated layers.

* * * * *